United States Patent [19]

Folkerts

[11] Patent Number: 4,552,377
[45] Date of Patent: Nov. 12, 1985

[54] HITCH PIN SECURING DEVICE

[76] Inventor: Cornie Folkerts, R.R. #1, Box 127, Inwood, Iowa 51240

[21] Appl. No.: 592,834

[22] Filed: Mar. 23, 1984

[51] Int. Cl.[4] ............................................. B60D 1/06
[52] U.S. Cl. .................................... 280/515; 280/507
[58] Field of Search ............................... 280/515, 507

[56] References Cited

U.S. PATENT DOCUMENTS

| 1,419,398 | 6/1922 | Mason . |
| 2,397,964 | 4/1946 | Hiniker . |
| 2,470,531 | 5/1949 | Suhl et al. . |
| 2,593,247 | 4/1952 | Benteman . |
| 2,697,618 | 12/1954 | Hulstedt . |
| 3,479,057 | 11/1969 | Miller . |
| 3,779,653 | 12/1973 | Charlton . |
| 3,794,357 | 2/1974 | Frye . |
| 4,394,031 | 7/1983 | Barton et al. . |

OTHER PUBLICATIONS

Drawing of unit found on John Deere 4-wheel drive tractors.
Drawing of unit found on Steiger Tractors.

*Primary Examiner*—Joseph F. Peters, Jr.
*Assistant Examiner*—Donn McGiehan
*Attorney, Agent, or Firm*—Wood, Dalton, Phillips, Mason, & Rowe

[57] ABSTRACT

A device for locking a hitch pin in a tongue hitch including a sleeve around a pivot pin mounted on the tongue. A retainer plate is mounted against the sleeve and pivotable about the pivot pin between a first position clear of the hitch pin and a second position blocking the hitch pin from withdrawal from the hitch connection. Stops are provided on both the tongue and the plate and a spring biases the stops together, in which position the plate is disposed above the hitch pin to lock it in the hitch.

7 Claims, 4 Drawing Figures

HITCH PIN SECURING DEVICE

TECHNICAL FIELD

This invention generally relates to hitches, and more particularly to a lock for securing a hitch pin.

BACKGROUND ART

Hitches connecting the tongue of a trailer or farm implement such as a plow to the drawbar of a tractor or other vehicle are well known in the art. These hitches have a vertical hitch pin which allows relative pivotal motion between the tongue and drawbar. The pin is generally extended through apertures in both the drawbar and the tongue.

Various devices have been used to secure the pin in the hitch to protect against inadvertent uncoupling. For example, objects such as hair pin and cotter pin retainers have been mounted on the pin end opposite its head to prevent withdrawal of the pin through the apertures. However, such retainers are awkward to use, are easily lost, and can be jerked out by crop stubble, dirt ridges, vibrations, etc. Threaded nuts have also been used but they too are awkward, easily lost, and can be spun off by vibrations, crop stubble, etc.

Various devices have also been used which block the head of the pin so as to prevent it from retracting out of the hitch. However, these blocking devices move between an open position which allows a pin to be inserted or withdrawn and a closed position which blocks the pin from being removed. The devices stay in whatever position they are placed, whether open or closed. Therefore, when such a device encounters a force during use which causes it to open, it will stay open until manually or accidentally corrected, and until corrected will not serve its intended function of locking the hitch pin in place. Devices of this type are shown, for example, in U.S. Pat. Nos. 1,419,398, 2,397,964, 2,593,247, 2,697,618, 3,779,653, 3,794,357 and 4,394,031.

U.S. Pat. No. 3,479,057 discloses a safety device for a trailer hitch in which an arm is suspended over a ball and socket hitch to keep the two secured together. The arm must be pushed down in order to pivot it away from the socket. This is difficult to do manually. Further, the downward force which would open this safety device is the most likely force to be encountered in the field. If any object were to rest on the arm so as to have its weight supported thereby, the arm would be naturally pivoted toward opening.

The present invention is directed toward overcoming one or more of the problems as set forth above.

SUMMARY OF THE INVENTION

In one aspect of the present invention, there is described a device for locking a hitch pin in a hitch connection. The device includes a sleeve around a pivot pin mounted on a tongue, and a retainer plate pivotable with the sleeve about the pivot pin between a first position clear of the hitch pin and a second position blocking the hitch pin from withdrawal from the hitch connection. Stops are provided on both the tongue and the plate. A spring biases the stops together, in which position the plate is disposed above the hitch pin to lock it in the hitch.

With the present invention, the hitch pin can be easily manually located in or removed from the hitch, and yet can be securely locked in the hitch so that the tongue and drawbar will not be inadvertently disconnected. If the plate encounters a force which causes it to pivot away from its locked position, it will immediately be moved back to the locked position once the force is gone. Therefore, the plate will at most be inadvertently unlocked only momentarily. Further, the force which would momentarily open the lock would be substantially horizontal and, since a horizontal force would not knock out the hitch pin, even in those few moments where the lock may be open there would be little danger of the hitch pin working free.

DESCRIPTION OF THE PREFERRED EMBODIMENT

Figure 1:
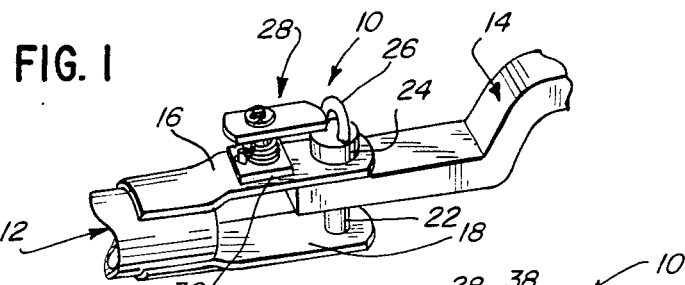
FIG. 1 is perspective view of a hitch embodying the present invention.

A hitch 10 is shown in the figures in which a trailer tongue 12 is pivotally connected to a drawbar 14 of a vehicle such as a tractor (not shown). The trailer tongue 12 has two vertically spaced lips 16,18 and the drawbar 14 is located between the lips 16,18 with apertures 20 through the lips 16,18 and drawbar 14 vertically aligned. A hitch pin 22 extends through the apertures 20 and has an enlarged head 24 which rests on the upper lip 16. The pin head 24 has a ring 26 so that the pin 22 can be easily removed to disconnect the tongue 12 and drawbar 14. This structure is all well known in the art.

The present invention relates to the lock 28 also shown in the figures which prevents the hitch pin 22 from being accidentally dislodged from the hitch 10. As shown in the figures, the lock 28 is a single unit on a base 30 which is suitably fixed to the upper lip 16 of the tongue 12, as by welding. The single unit lock 28 may be manufactured and sold separately from trailer tongues 12 for mounting on either new or old trailers, farm implements, wagon tongues and the like.

It is usually desirable to fix the lock 28 to the tongue 12 as shown because in many cases the drawbar extends transversely and, rather than having one aperture 20 as shown in the figures, has a number of different apertures allowing different implements to be connected in different positions. However, it should be understood that the lips could be part of the drawbar and the lock 28 could be fixed to such a drawbar rather than the tongue.

The lock 28 includes a pivot pin 32 which is secured upright on the base 30. A sleeve 34 is positioned around the pin 32 and at its upper end defines a shoulder 36 to which a pin retaining plate 38 is suitably fixed. The sleeve 34 and the plate 38 thus rotate together about the pivot pin 32. The sleeve 34 and plate 38 are suitably secured against any substantial axial motion on the pivot pin 32, as by the shown C-ring 40 locked in a groove in the upper end of the pivot pin 32.

The lock 28 could also be manufactured without a sleeve and instead with a pivot pin (not shown) having a reduced diameter portion about which the plate 38 pivots and defining a shoulder on which the plate 38 is supported. The lock 28 as shown in the figures including a unitary sleeve and plate construction is however preferred as it provides a longer pivot axis and thus easily prevents twisting of the plate 38 out of its plane of rotation.

Figure 2:
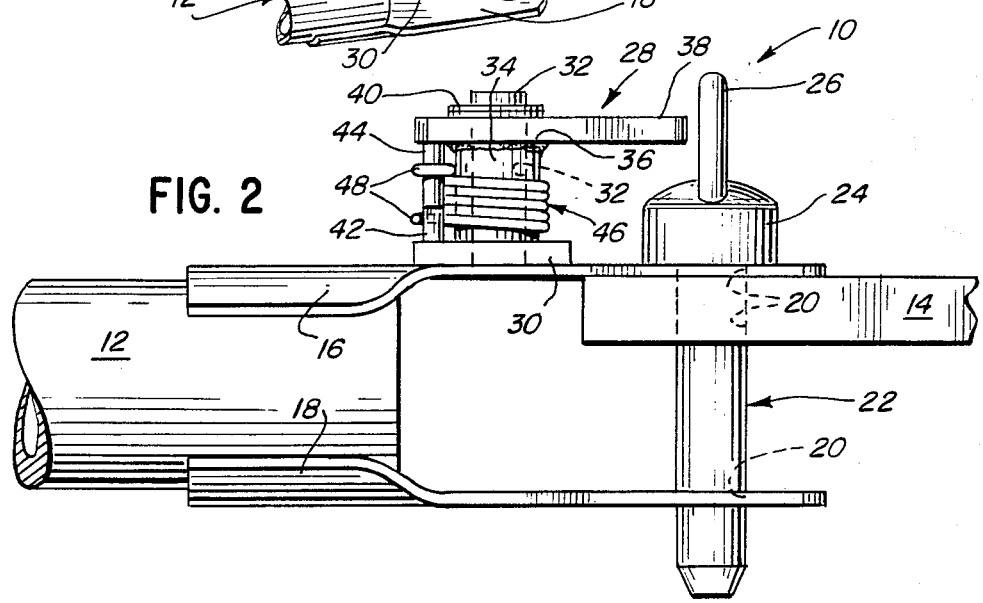
FIG. 2 is a side view of the hitch of FIG. 1.
Figure 3:
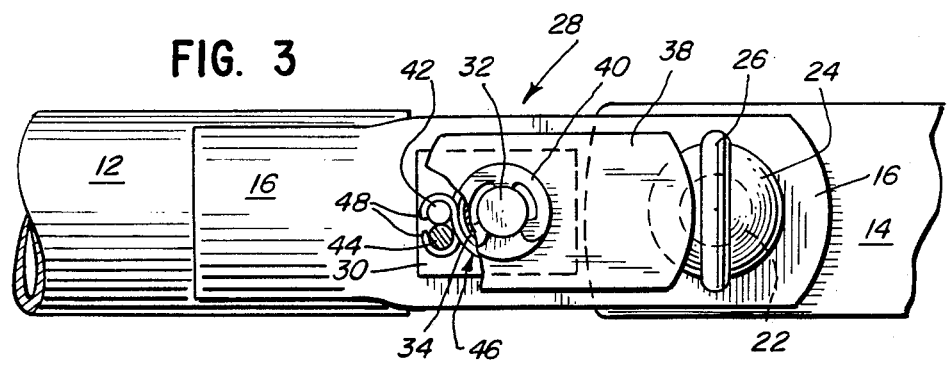
FIG. 3 is a partially broken top view of the hitch of FIG. 1.
Figure 4:
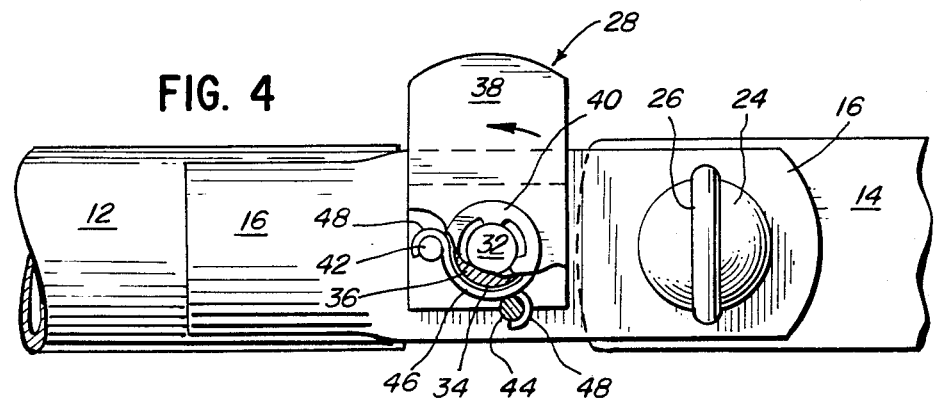
FIG. 4 is a view similar to FIG. 3 showing the lock in its open position.

A base stop member 42 is fixed to and extends up from the base 30. A plate stop member 44 is fixed to and extends down from the plate 38. The combined height of the two stop members 42,44 is greater than the height of the sleeve 34 and both are fixed at substantially the same radial distance from the pivot pin 32 so that they abut one another in the locking (or blocking) position as shown in FIGS. 2 and 3. The plate 38 is elongated so that it can either extend above the hitch pin 22 in the locking position shown in FIGS. 2 and 3 or can be turned clear of the hitch pin 22 as shown in FIG. 4.

A torsional coil spring 46 is located around the sleeve 34 and its ends 48 are hooked to grasp the respective stop members 42,44. The stop members 42,44 may have grooves therein if desired to hold the spring ends 48 from sliding up and down. The spring 46 biases the stop members 42,44 together to the locking position.

The lock 28 thus operates as follows. The plate 38 can be manually turned to the position shown in FIG. 4 clear of the hitch pin 22 and a hitch pin 22 quickly and easily inserted to connect (or removed to disconnect) the trailer tongue 12 and the drawbar 14. After a hitch pin 22 is inserted, the plate 38 is released and the spring 46 automatically returns the plate 38 over the pin 22 as shown in FIG. 3. In this locking position, the plate 38 blocks the hitch pin 22 from being vibrated out, knocked out, or in any way forced out to inadvertently disconnect the tongue 12 and drawbar 14. Should something thereafter strike the plate 38 to momentarily pivot it away from it from its locking position, the spring 46 will cause the plate to immediately move back to its locking position once the force is gone. Further, the plate 38 would be forced out of its locking position only by a generally horizontal force, which force would not knock out the hitch pin 22, and therefore there would be little danger of the hitch pin 22 working free even in those few moments where the plate 38 is forced out of its locking position.

This lock 28 is an inexpensive device which may be used with new or existing trailer tongues to securely lock a pin in a hitch. The lock easily allows a pin to be moved in or out of the hitch to connect or disconnect the tongue and drawbar. The base 30 may be easily secured (by welding, brazing, bolting, etc.) to the tongue of a pulled implement and will be ever-present to secure same to a tractor. Still other aspects, objects and advantages of the present invention may be obtained from a study of the drawings, the disclosure and the appended claims.

I claim:

1. A device for locking a hitch pin in a hitch in which the hitch pin extends from a first side through first and second members to connect said members, comprising:

a pivot pin secured to the first side of the first member;

means for defining a shoulder about the pivot pin and spaced from the first side;

a pin retainer plate on the defined shoulder, the plate being pivotable about the pivot pin between a first position clear of the hitch pin and a second position blocking the hitch pin from withdrawal from the first and second members;

means for securing the plate against substantial axial motion on the pin;

a first stop secured to the first member;

a second stop secured to the plate, said first and second stops abutting when the plate is in the second position; and means for biasing the stops toward abutment from said first position.

2. The device of claim 1, wherein the shoulder defining means is a sleeve secured to the plate and pivotable about the pivot pin.

3. The device of claim 1, wherein the securing means is a C-ring received within a groove about the pivot pin.

4. The device of claim 1, wherein the biasing means is a torsion spring.

5. The device of claim 4, wherein the torsion spring is a coil spring disposed about the pivot pin and having its opposite ends secured to the first and second stops respectively.

6. The device of claim 1, wherein the first member is a trailer tongue and the second member is a vehicle drawbar.

7. In a hitch connection between a vehicle drawbar and a two lip trailer tongeue, the drawbar being pivotably secured between the upper and lower lips of the tongue by a hitch pin extending through aligned apertures in the lips and drawbar, a device for locking the hitch pin therein comprising:

an upwardly extending pivot pin secured to the upper lip;

a sleeve freely pivotable around the pivot pin;

a pin retainer plate pivotable with the sleeve between a blocking position in which a portion of the plate is above the hitch pin and an open position in which the plate is spaced from the hitch pin allowing the hitch pin to be axially withdrawn from the drawbar and tongue;

a first stop extending upwardly from the tongue;

a second stop extending downwardly from the plate and abutting the first stop when the plate is in the blocking position; and a torsion coil spring disposed about the sleeve and having its opposite ends secured to the first and second stops respectively to bias the stops toward abutment.

* * * * *